(12) United States Patent
Martinez et al.

(10) Patent No.: US 12,707,544 B2
(45) Date of Patent: Aug. 11, 2026

(54) CONTROLLED TRANSIENT RESPONSES IN FOUR-SWITCH BUCK BOOST POWER STAGES

(71) Applicant: TEXAS INSTRUMENTS INCORPORATED, Dallas, TX (US)

(72) Inventors: Gustavo Martinez, Missouri City, TX (US); Han Zhang, Missouri City, TX (US); Robert Sheehan, Grand Ridge, FL (US); Manish Bhardwaj, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 159 days.

(21) Appl. No.: 18/342,233

(22) Filed: Jun. 27, 2023

(65) Prior Publication Data

US 2024/0324081 A1 Sep. 26, 2024

Related U.S. Application Data

(60) Provisional application No. 63/453,889, filed on Mar. 22, 2023.

(51) Int. Cl.
*H05B 45/3725* (2020.01)
*H02M 1/00* (2006.01)
*H02M 3/158* (2006.01)

(52) U.S. Cl.
CPC ...... *H05B 45/3725* (2020.01); *H02M 1/0009* (2021.05); *H02M 1/0012* (2021.05); *H02M 3/1582* (2013.01)

(58) Field of Classification Search
CPC ............ H05B 45/3725; H02M 1/0009; H02M 1/0012; H02M 3/1582; H02M 1/0019; H02M 3/1566; H02M 1/0025
USPC .......................................................... 315/291
See application file for complete search history.

(56) References Cited

U.S. PATENT DOCUMENTS

| | | | | |
|---|---|---|---|---|
| 8,917,035 | B2 | 12/2014 | Zhang et al. | |
| 9,203,311 | B2 * | 12/2015 | Penzo | H02M 3/1582 |
| 9,525,350 | B2 * | 12/2016 | Hari | H02M 1/15 |
| 9,584,022 | B1 * | 2/2017 | Galvano | H05B 45/48 |
| 10,070,489 | B1 * | 9/2018 | Galvano | H05B 45/10 |
| 10,321,539 | B1 * | 6/2019 | Borghetti | H05B 45/38 |
| 10,420,178 | B2 * | 9/2019 | Milanesi | H05B 45/48 |
| 10,594,218 | B1 * | 3/2020 | Zhan | G05F 1/62 |
| 11,069,309 | B2 * | 7/2021 | Sultenfuss | G09G 3/3406 |

(Continued)

OTHER PUBLICATIONS

International Search Report mailed on May 2, 2024, PCT Application No. PCT/US2023/086371 filed Dec. 29, 2023, 4 pages.

(Continued)

*Primary Examiner* — Ryan Jager
(74) *Attorney, Agent, or Firm* — Carl G. Peterson; Frank D. Cimino

(57) ABSTRACT

Four-switch buck boost power stages with reduced overshoot conditions at an output node are presented. Based on a detected condition for a decrease in a quantity of the active load elements, the method includes enabling an active discharge circuit coupled to an output node of a power stage before the quantity of the active load elements is decreased. Based on a detected condition for an increase in the quantity of the active load elements, the method includes activating the load elements and applying a restricted gain to the voltage conversion circuit.

20 Claims, 9 Drawing Sheets

(56) References Cited

U.S. PATENT DOCUMENTS

| | | | | |
|---|---|---|---|---|
| 11,382,198 | B2 * | 7/2022 | Galvano | H05B 45/382 |
| 11,438,982 | B2 | 9/2022 | Song | |
| 11,737,190 | B2 * | 8/2023 | Hariharan | H05B 45/36<br>315/119 |
| 12,088,204 | B2 * | 9/2024 | Huang | H02M 3/1582 |
| 2009/0218960 | A1 * | 9/2009 | Lyons | G01J 1/32<br>315/297 |
| 2010/0026203 | A1 * | 2/2010 | Zhao | H05B 45/20<br>315/291 |
| 2011/0249033 | A1 * | 10/2011 | Oh | G09G 3/3648<br>345/690 |
| 2014/0368240 | A1 | 12/2014 | Shelton | |
| 2015/0008734 | A1 * | 1/2015 | Ishida | F02N 11/0825<br>307/10.1 |
| 2015/0256071 | A1 * | 9/2015 | Penzo | H05B 45/48<br>315/297 |
| 2015/0280559 | A1 * | 10/2015 | Vaidya | H02M 3/158<br>323/271 |
| 2021/0185780 | A1 | 6/2021 | Lula et al. | |
| 2022/0039236 | A1 | 2/2022 | Hariharan | |
| 2023/0283168 | A1 * | 9/2023 | Moretti | H02M 1/0009<br>323/271 |

OTHER PUBLICATIONS

Written Opinion mailed on May 2, 2024, PCT Application No. PCT/US2023/086371 filed Dec. 29, 2023, 4 pages.

Maxlinear, 'Active Load Current Regulator for Phase-Cut Dimmable AC Direct Drive LED Lamp', XR46010 Datasheet, Sep. 1, 2018 [retrieved on Apr. 5, 2024], Retrieved from: <URL: https://datasheetspdf.com/datasheet/XR46010.html>, 8 pages.

Extended European Search report for Corresponding Application No. 23928987.9 mailed Jun. 1, 2026, 10 pages.

* cited by examiner 600
1 DISABLE VOLTAGE REGULATION
SET LINEAR GAIN
INCREASE QUANTITY LOAD ELEMENTS
2 SET CONSTANT GAIN
3 ENABLE VOLTAGE REGULATION
RESUME NORMAL OPERATION
610
611
612
$V_{LOAD}$ = 12V
$V_{LOAD}$ = 36V
1
2
3
t (us)
0
50
100
150
200
250
300
350
400
450
500
0
0.1
0.2
0.3
0.4
0.5
0.6
0.7
0.8
0.9
1

CONTROLLED TRANSIENT RESPONSES IN FOUR-SWITCH BUCK BOOST POWER STAGES

RELATED APPLICATIONS

This application hereby claims the benefit of and priority to U.S. Provisional Patent Application No. 63/453,889, titled "Four-Switch Buck-Boost Converter Using Real-Time Controller." filed Mar. 22, 2023, which is hereby incorporated by reference in its entirety.

TECHNICAL BACKGROUND

In an automotive headlight design, LED driver stages can be used to drive a string of LEDs forming the headlight. By varying the number of LEDs turned on, an automotive headlight can implement functions such as high-beam and low-beam, or more advanced functions such as adaptive driving beams (ADBs). In some examples, a driver stage for the LED headlight is arranged to supply a constant current to the LED string under differing load conditions. During load transitions, such as when LEDs in the string are turned on or off, the LED driver stage must transition output voltages quickly in order to minimize visible flicker and also to limit current overshoots which can potentially damage the LEDs.

Various power stage topologies can be used in LED driver designs. Among these topologies, four-switch buck boost power topologies (often referred to as 4SWBB), can provide relatively higher efficiency, lower cost, and smaller footprints, along with reduced conduction loss as compared to two-switch buck-boost topologies. However, four-switch buck boost power topologies often require a large capacitance (e.g., 20 microfarads (μF) or higher) on an output node to minimize ripple on the output voltage from operation of the four switching elements. The large output capacitance can hinder transient responses to rapidly changing loads and result in unwanted current overshoot conditions. This has prevented adoption of 4SWBB power stages in many applications, such as in LED headlights, among other applications. Additionally, increasingly stringent operational requirements and standards for LED headlights in vehicles can lead to magnified transient response difficulties for existing designs and topologies.

SUMMARY

The examples herein discuss enhanced four-switch buck boost power topologies, referred to as 4SWBB power stages, to reduce unwanted overshoot conditions at an output node, to prevent damage to load circuitry and to provide enhanced transient response. For example, in order for the 4SWBB power stage to be adopted in automotive LED headlight designs, it is recommended to keep the current overshoot under 20% and be able to transition the between relevant output voltages in under 200 microseconds (μs).

The examples herein provide for a controlled transition scheme for 4SWBB power stages under rapid load changes. For load transitions which rapidly decrease a load level, a control loop for a controller of a 4SWBB power stage can be bypassed or disabled while the output node is drained by an active discharge circuit which can be enabled and disabled according to a target output voltage. Then, the load can be transitioned to the decreased load level. For load transitions which rapidly increase a load level, the load level is increased concurrent with programmable restricted gains applied to the control loop such that a linear gain increase is applied for a period of time to control the output node transition, followed by a settling time at a constant gain before normal operation resumes.

In one example implementation, a method includes obtaining a request for a change in a quantity of active load elements at an output node supplied by a voltage conversion circuit. Based on the request indicating a decrease in the quantity of the active load elements, the method includes enabling an active discharge circuit coupled to the output node before the quantity of the active load elements is decreased. Based on the request indicating an increase in the quantity of the active load elements, the method includes activating the load elements and applying a restricted gain to the voltage conversion circuit.

In another example, an apparatus includes a power controller configured to obtain a request for a change in a quantity of active load elements at an output node supplied by a voltage conversion circuit. The apparatus also includes a transient control circuit. Based on the request indicating a decrease in the quantity of the active load elements, the transient control circuit is configured to enable an active discharge circuit coupled to the output node before the quantity of the active load elements is decreased. Based on the request indicating an increase in the quantity of the active load elements, the transient control circuit is configured to apply a restricted gain to the voltage conversion circuit with activation of the load elements.

In yet another example, a system includes a power controller configured to provide control signals for a voltage conversion unit providing power to an output node. The system also includes an active discharge circuit coupled to the output node and comprising a selectable discharge connection to ground. The power controller is configured to enable the active discharge circuit prior to a decrease in a quantity of activated load elements at the output node. The power controller is configured to apply a constrained gain to the voltage conversion unit to support an increase in the quantity of the activated load elements at the output node.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The examples herein discuss enhanced power stage techniques and circuitry. Although the examples used herein can apply to four-switch buck boost power topologies, referred to as 4SWBB power stages, these techniques and circuitry can also be applied to other power stage topologies. One limitation with conventional 4SWBB power stages is the large output capacitance (C) of 20 μF or higher. For example, in automotive headlight applications, when switching from 12 LEDs in a high beam configuration (e.g., driven using 36 VDC at 1 Amp (A)) to 4 LEDs in a low beam configuration (e.g., driven using 12 VDC at 1A), up to 30 amps (A) of overshoot current can be generated (current=C dV/dt=20 μF*1SV/10 μs=30A). In order for the 4SWBB topology to be adopted in automotive headlight designs, this topology should keep current overshoot under 20% and be able to transition between 36 VDC and 12 VDC provided to the LEDs in under 200 μs. The enhanced techniques and configurations discussed herein include a feedforward gain control algorithm which controls the gain of the 4SWBB power stage during load transitions. The control algorithm can leverage a processing device or control system to control transitions of the load between different load conditions.

Thus, the examples herein can reduce unwanted overshoot conditions at an output node of a power stage, to prevent damage to load circuitry and to provide enhanced transient response. For load transitions which rapidly decrease a load level, a control loop for a controller of a power stage can be bypassed or disabled while the output node is drained by an active discharge circuit which can be enabled and disabled according to a target output voltage. Then, the load can be transitioned to the decreased load level. For load transitions which rapidly increase a load level, the load level is increased concurrent with programmable restricted gains applied to the control loop such that a linear gain increase is applied for a period of time to control the output node transition, followed by a settling time at a constant gain before normal operation resumes.

Figure 1:
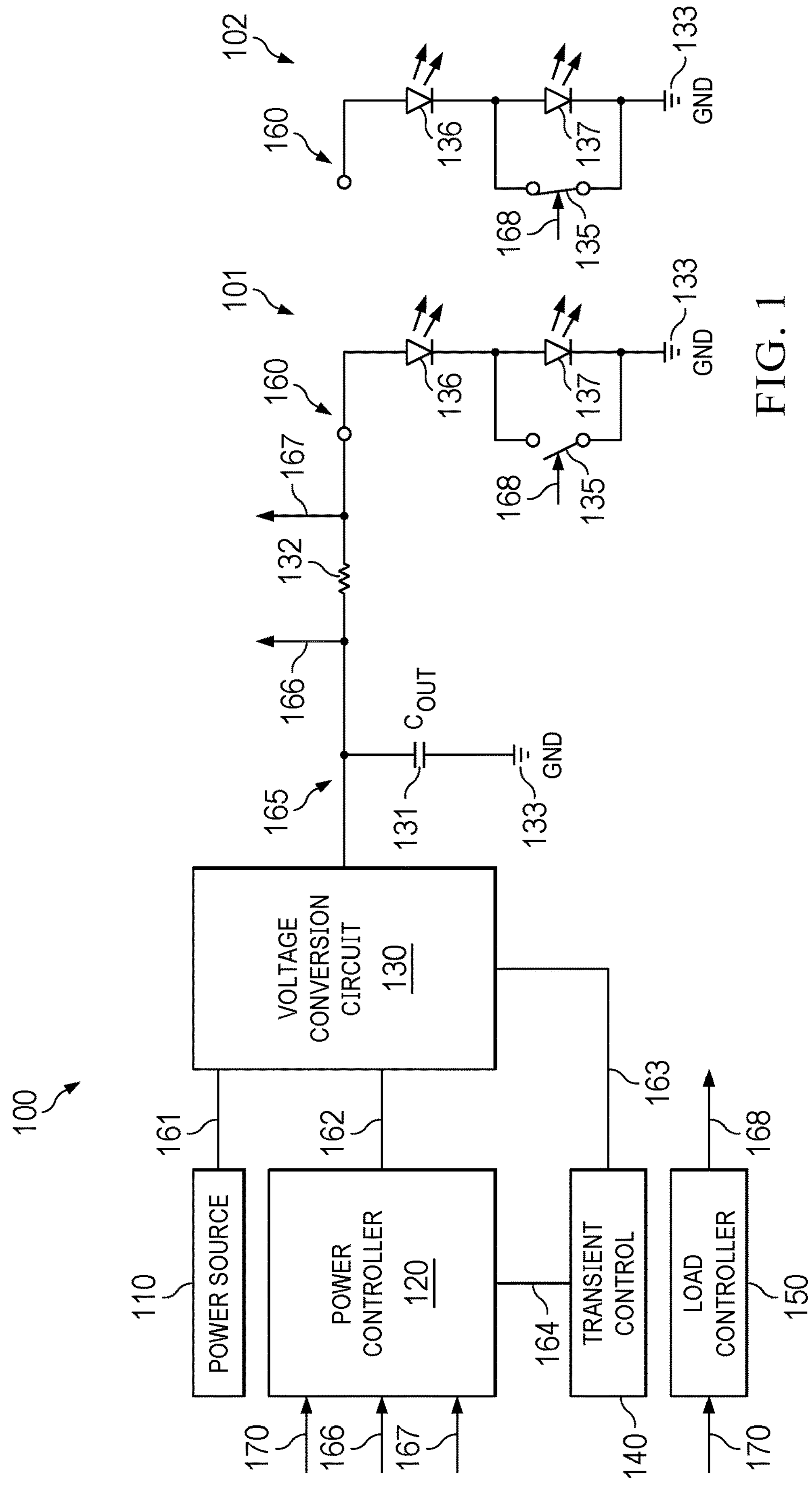
FIG. 1 illustrates an example power system including voltage conversion circuitry in an implementation.

Turning to a first example implementation, FIG. 1 is presented. FIG. 1 illustrates power system 100 which includes voltage conversion circuitry having power controller 120. Power controller 120 controls operation of voltage conversion circuit 130 over link 162. Voltage conversion circuit 130 takes an input voltage supplied by power source 110 over link 161 and converts this input voltage into an output voltage at intermediate node 165. Output capacitance ($C_{out}$) 131 coupled between intermediate node 165 and electrical ground 133. Intermediate node 165 is coupled to output node 160 through current sense resistor 132. Terminals of current sense resistor 132 are coupled over links 166-167 to power controller 120. Although a sense resistor is employed for current sensing functionality in FIG. 1, it should be understood that other circuitry can instead be employed to sense a current provided to a load circuit at output node 160.

A load circuit is coupled between output node 160 and electrical ground 133, namely light-emitting diodes (LEDs) 136-137. Switch 135 can selectively activate or de-activate LED 137 according to a state of link 168. Other load types can be employed, but this example includes an implementation which might be included in a headlight assembly. Power system 100 includes load controller 150 which receives LED activation signaling over link 170 and responsively produces switch control signaling over link 168. Load configuration 101 shows both LED 136 and 137 activated with switch 135 in an open state, and load configuration 102 shows LED 136 activated and LED 137 bypassed or deactivated with switch 135 in a closed state.

Power controller 120 is coupled to transient control element 140 over link 164. Power controller receives current sense signaling over links 166-167 and LED activation signaling over link 170. Transient control element 140 receives status/control signaling over link 164 and produces transient control signaling over link 163. In operation, power controller 120 provides control signaling over link 162 to activate switching elements of voltage conversion circuit 130 and produce a target voltage and current at intermediate node 165. For LED load examples, a constant current is targeted under varying conditions having different quantities of active LEDs. During non-transient conditions, power controller 120 can monitor links 166-167 to determine how much current is being supplied to the load circuit, and perform load regulation to obtain a target output current at output node 160. The output voltage can be monitored at either node 160 or node 165.

During transient conditions, such as when LED activation signaling over link 170 indicates a change in load state, power controller 120 can obtain a request over link 170 for a change in a quantity of active load elements at output node 160 supplied by voltage conversion circuit 130. Based on the request indicating a decrease in the quantity of the active load elements, transient control element 140 enables an active discharge circuit coupled to output node 160 before load controller 150 decreases the quantity of the active load elements via link 168 (which closes switch 135). Based on the request indicating an increase in the quantity of the active load elements, load controller 150 activates the load elements via link 168 (which opens switch 135) and power controller 120 applies a restricted gain to voltage conversion circuit 130.

Returning to a description of the elements in FIG. 1, power controller 120 comprises any combination of integrated circuitry, which can include processors, processing circuitry, microprocessors, microcontrollers, application-specific integrated circuit (ASIC) elements, analog and digital circuitry, discrete logic elements, analog circuitry, memory or digital storage devices, digital signal processing (DSP) elements, graphics processing units, programmable logic elements, field-programmable gate arrays, and/or any other processing resources. One example of power controller 120 includes a Texas Instruments C2000™ real-time microcontroller with multiple real-time processing portions. In some examples, power controller 120 may include multiple components, such as any combination of the processing or circuitry resources listed above, as well as other discrete or integrated logic circuitry, and/or analog circuitry. Certain portions of the techniques of this disclosure, such as transient detection, load regulation, power regulation, power conversion elements, active discharge and control thereof, and various monitoring circuitry, may be implemented with discrete components, passive components, and/or control links coupled between processing circuitry and the discrete components.

Power controller 120 provides control signaling to a power stage, namely pulse width modulated (PWM) signals to voltage conversion circuit 130 over link 162. Link 162 may comprise more than one link or signals which share a common link. Link 162 carries activation pulse signals, such as PWM signaling, used to activate power phases of voltage conversion circuit 130. Power controller 120 receives feedback or monitoring signaling over links 166 and 167, among other links not shown in FIG. 1 for clarity. Current sense links 166 and 167 provide an indication of a current provided by voltage conversion circuit 130, which is based on voltages measured for nodes 165 and 160. The sense links may comprise analog or digital representations of the sensed property, and may share links using a timewise or rotating/handshaking configuration. Various other sensing or control links corresponding to power controller 120 are omitted in FIG. 1 for clarity, and can be coupled to various nodes of interest, such as an input voltage supplied by power source 110 over link 161, and other various electrical nodes.

Power controller 120 can include transient control element 140, or transient control element 140 can be at least a partially separate module or set of circuitry. Transient control element 140 can be implemented with the above components mentioned for power controller 120, or instead may be implemented at least partially with separate circuitry from power controller 120. Transient control element 140 includes circuitry to monitor operational or status properties voltage conversion circuit 130, such as output voltages or output currents. Transient control element 140 can determine alerts for entry and exit of transient states or transient modes of operation. These alerts can be provided to various external circuitry, to power controller 120 over link 164, or to one or more user interfaces. The alerts can comprise discrete analog or digital signaling, various digital messaging, or can be provided over a serial link, data bus, optical link, wireless link, or other various links.

Transient control element 140 also provides for programmable elements which can be used to alter various transient performance aspects, such as thresholds for voltage levels, time period thresholds, gain parameters, number PWM cycles to slew gain, target gain after low to high transitions, gain slew rate during low to high transitions, and other various programmable aspects of power system 100. Further programmable parameters include various parameters which can be used to tune the response of the system. For example, target voltages at with to enable/disable an active discharge circuit during high to low load transitions, a delay (in PWM cycles) between closing LED bypass switches and starting active discharge with the active discharge circuit, a feedforward target gain after high to low load transitions, and a delay (in PWM cycles) between opening LED bypass switches and starting a linear gain increase or ramp.

Voltage conversion circuit 130 includes one or more switch elements capable of operating in buck mode, boost mode, or buck-boost mode of operation, among other operational modes. The switch elements typically comprise power transistors, and these transistor elements can be activated (i.e., turned on, off, or placed into high impedance (Z) states) using control links coupled to corresponding transistor gate terminals. Various transistor topologies can be employed, such as four-switch buck boost (4SWBB) topologies, which accept PWM signals coupled to transistor gate terminals. Control of these gate terminals is used to convert input voltage (Vin) to an output voltage at intermediate node 165. By controlling signaling over link 162, power controller 120 can selectively enable or disable each power transistor/switch, as well as control operation for each once enabled. Vin is provided at link 161 to voltage conversion circuit 130, after any associated power conditioning in power source 110 which can provide filtering, electromagnetic interference (EMI) protection, overvoltage protection, and other various conditioning of a source power.

Figure 2:
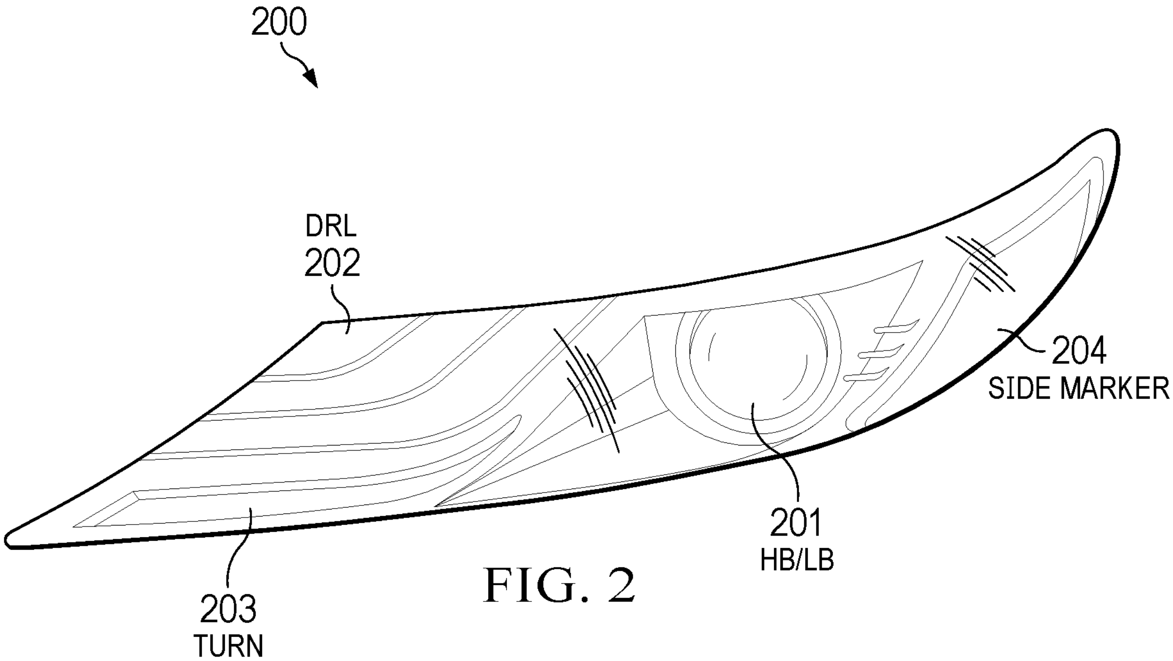
FIG. 2 illustrates an example headlight assembly in an implementation.

FIG. 2 is presented as an example physical assembly in which the circuitry/system of FIG. 1 can be employed, or any of the example implementations below. FIG. 2 illustrates an example headlight assembly 200 in an implementation, but there are other possible power systems in which the techniques of this disclosure can be implemented. Headlight assembly 200 can be employed in an automobile or other vehicle, although other types of assemblies and applications can be employed instead. Headlight assembly 200 includes several indicator light portions, namely headlight high beam (HB)/low beam (LB) 201, daytime running light (DRL) 202, turn signal 203, and side marker 204. A number of instances of system 100 might be employed in headlight assembly 200, or to control indicator lights within headlight assembly 200. For example, system 100 shows two load configurations 101-102. HB/LB 201 can have two load configurations, one for a high beam configuration and one for a low beam configuration, and these configurations can correspond to configurations 101-102 of FIG. 1. Likewise, on/off states of daytime running light (DRL) 202, turn signal 203, and side marker 204 might correspond to configurations 101-102 of FIG. 1.

Figure 3:
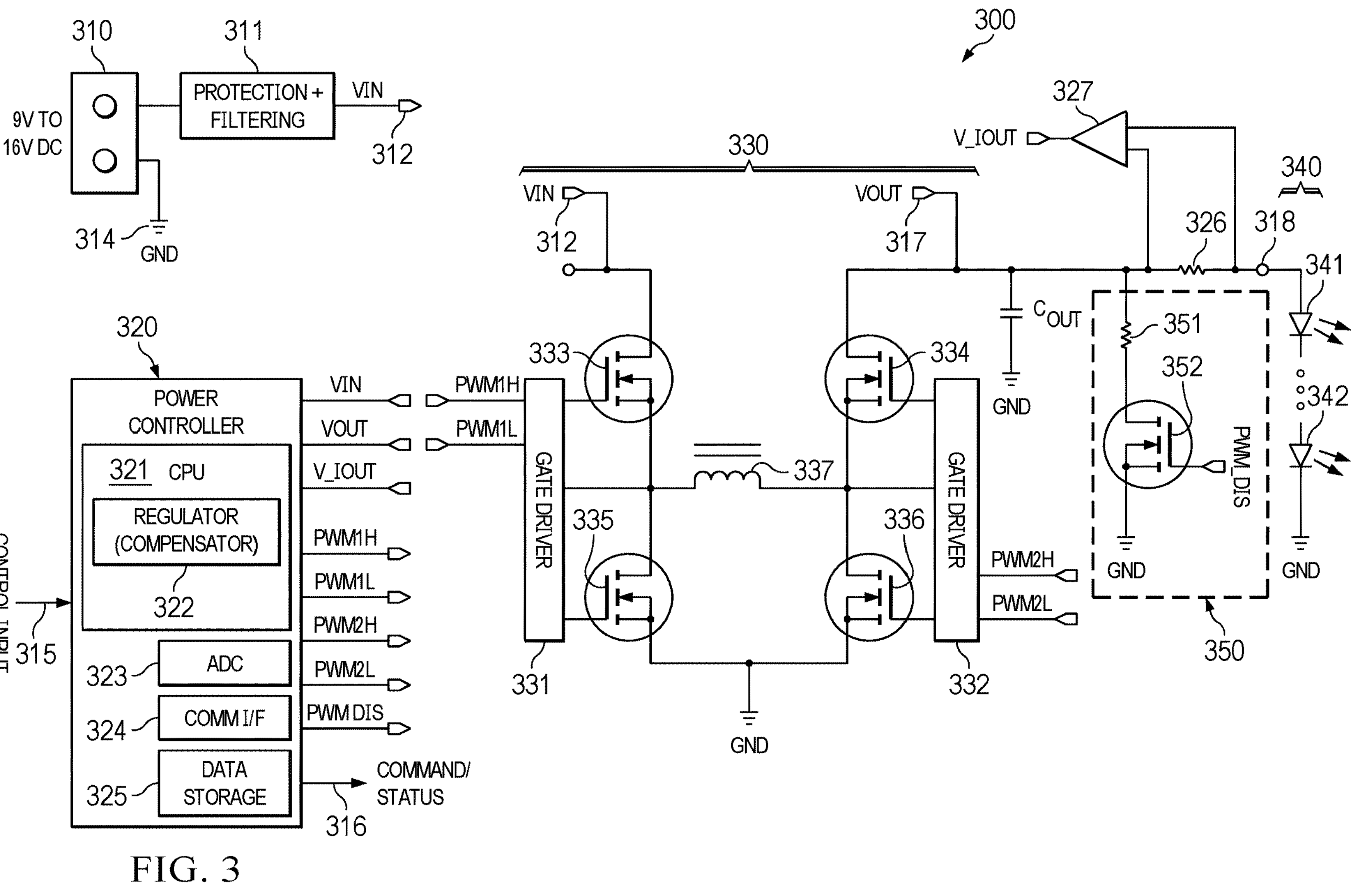
FIG. 3 illustrates example operations for voltage conversion circuitry in an implementation.

FIG. 3 illustrates an example power system 300 including a four-switch buck boost (4SWBB) power stage 330 in an implementation, which can also be referred to as a voltage conversion circuit. Power system 300 includes several sections or portions, namely an input section associated with input connector 310, power controller 320, power stage 330, load elements 340, and active discharge circuitry 350. An electrical ground is referenced by the various circuitry in FIG. 3, namely ground 314, although more than one reference potential might be employed in other examples. Power system 300 includes an input section comprising input connector 310 which has a positive terminal coupled to protection and filtering stage 311 which produces an input voltage for power stage 330 at node 312. Also, input connector 310 provides a connection to electrical ground 314.

Power controller 320 includes various modules, namely central processing unit (CPU) 321, regulator 322, analog to digital conversion unit (ADC) 323, communication interface 324, and data storage unit 325. These modules can be interconnected by various links, which can include digital or analog links, data bus arrangements, signal messaging, or other communication or link types. The exact arrangement of modules in power controller 320 can vary based on implementation, and one or more modules might be incorporated into others of the modules.

CPU 321 comprises a microprocessor or similar integrated circuit, such as a Texas Instruments C2000™ real-time microcontroller with multiple real-time processing portions, which processes telemetry received from various monitoring nodes of power system 300 and determines various control settings to produce a target output voltage at Vout node 317. This telemetry includes indications of state of a Vin node (e.g., $V_{in1}$) 312, Vout node 317, current sense node 318, and control input 315. In FIG. 3, a sense amplifier 327 is included which interprets a voltage difference between Vout node 317 and current sense node 318 (established across current sense resistor 326) to produce an indication of a current supplied to load elements 340, noted as node $V_{Iout}$. ADC 323 can convert analog signaling carrying the various telemetry into a digital format for use by elements of power controller 320.

Regulator 322 receives instructions or commands from CPU 321 to determine control signals for power stage 330, namely PWM1H, PWM1L, PWM2H, and PWM2L comprising pulse width modulated signals configured to control switching operation of transistors 333-336 of power stage 330. In this example, transistors 333-336 are not driven directly by signals PWM1H, PWM1L, PWM2H, and PWM2L, and instead gate drivers 331-332 are employed to generate the proper voltage or current levels for the particular transistor technology or type employed. In other examples, gate driving elements or circuitry can be included in regulator 322. The frequency of the pulse width modulated signals can vary based on application and implementation, but in FIG. 3 an example PWM frequency includes 200 kilohertz (kHz).

Communication interface 324 can communicate over wired, wireless, or optical communication links. Communication interface 324 can receive various communication from external systems or modules, such as control input 315 and instructions to read, write, or erase various programmable registers contained in data storage 325. Also, communication interface 324 can provide user interfaces, programming interfaces, network interfaces, digital or analog interfaces, or other interfacing and communication links to communicate with external systems, user devices, monitoring devices, control devices, telemetry systems, automotive computer systems, or other various endpoints.

Data storage unit 325 comprises various non-volatile storage elements configured to store data employed in programmable registers. These programmable registers can be employed to control various operations or functionality of power controller 320, such as the various programmable parameters discussed herein for transient control element 140 of FIG. 1. Data storage unit 325 can also store various status or telemetry data related to the operation of power system 300. This storage data can be provided to external systems by communication interface 324. In one example, command and status information stored by data storage unit 325 is provided over link 316 by communication system 324.

Power stage 330 includes four power transistors 333-336, which have gate terminals coupled to corresponding gate drivers 331-332. Gate drivers 331-332 can receive PWM signals from power controller 320 (PWM1H, PWM1L, PWM2H, and PWM2L) and provide selected impedance characteristics, voltage levels, current levels, or level shifting operations to drive gate terminals of the corresponding transistors. Transistor 335 has a source terminal coupled to ground and a drain terminal coupled to a first terminal of inductor 337. Transistor 333 has a drain terminal coupled to Vin (312) and a source terminal coupled to the first terminal of inductor 337. Transistor 336 has a source terminal coupled to ground and a drain terminal coupled to a second terminal of inductor 337. Transistor 334 has a drain terminal coupled to Vout node 317 and a source terminal coupled to the second terminal of inductor 337. Inductor 337 can comprise a suitable valued inductor, set of inductors, or transformer coil that achieves a target operation of power stage 330, which can vary based on switching frequency of the PWM signals, ripple current requirements, packaging requirements, or other considerations.

An output capacitance ($C_{out}$) is provided at node 317, which filters some of the switching noise produced by transistors 333-336. $C_{out}$ can comprise a suitable valued capacitor or multiple capacitors in parallel that achieves a target operation of power stage 330, which can vary based on switching frequency of the PWM signals, ripple current requirements, packaging requirements, or other considerations. In FIG. 3, an example $C_{out}$ is 18.8 μF. Load elements 340 are coupled through current sense resistor 326 to Vout node 317 as well, which comprises current sense node 318 in this example. Load elements 340 include one or more load elements, which in this example comprise LEDs 341-342 coupled between current sense node 318 and ground. The ellipses in FIG. 3 show that more than two LEDs might be included, such as a string or serial chain of many LEDs. Although not shown for clarity in FIG. 3, each LED might have a corresponding switch (e.g., transistor) coupled in parallel to enable or bypass the corresponding LED according to commands or control provided by control input 315. In this manner, a selected quantity of LEDs can be activated at any particular time based on control signaling of control input 315.

Active discharge circuitry 350 comprises power transistor 352 coupled through resistor 351 to Vout node 317. Transistor 352 has a gate terminal coupled to PWM_DIS signal, a source terminal coupled to ground, and a drain terminal coupled to discharge resistor 351. Active discharge circuitry 350 is configured to drain charge from Vout, or from any among nodes 317 or 318. Specifically, the charge might be stored in $C_{out}$, among other energy storage elements (parasitic or associated with load elements 340). When active, transistor 352 is configured to allow Vout node to drain through resistor 351 to ground. When inactive, transistor is configured to decouple resistor 351 from ground. Resistor 351 can be arranged on either the drain terminal of transistor 352 (as shown) or the source terminal of transistor 352. Although a resistor component is shown for resistor 351, other suitable resistive or impedance elements can be employed.

Figure 4:
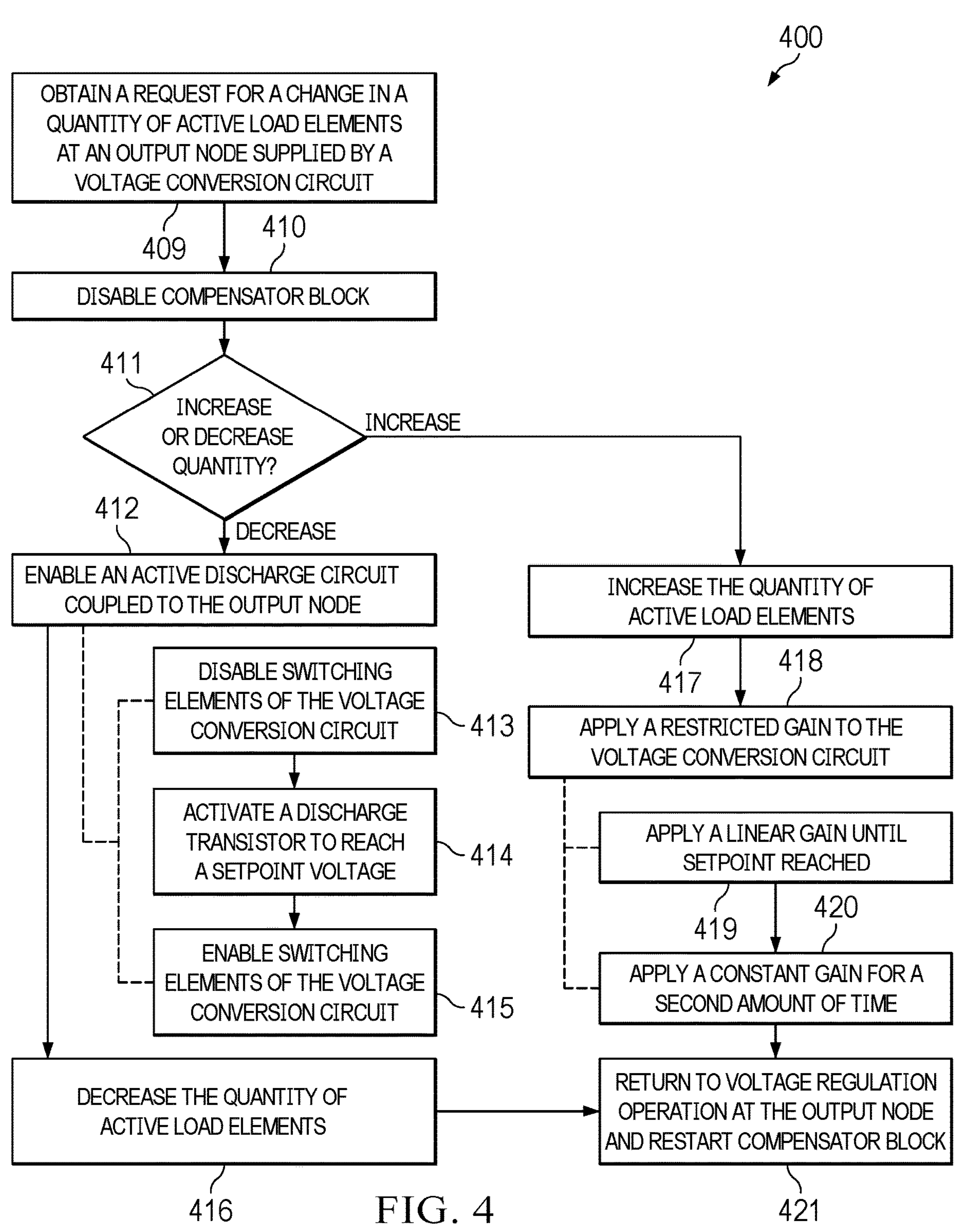
FIG. 4 illustrates an example power system including a four-switch buck boost power stage in an implementation.

FIG. 4 illustrates example operations for voltage conversion circuitry in an implementation, such as for system 100 of FIG. 1, headlight assembly 200 of FIG. 2, or system 300 of FIG. 3. Operations 400 are discussed in the context of FIG. 3 for clarity. The operations of FIG. 4 can be applied to other example implementations herein, with corresponding circuit and controller elements performing the operations according to their associated structures and arrangements. Moreover, the operations of FIG. 4 can be performed, at least in part, by elements of control system 900 of FIG. 9.

For certain example load types that include automotive headlights with a string of LEDs, an LED driver stage in the headlight should ideally supply a constant current to the LED string under all load conditions. During load transitions, such as when LEDs in the string are turned on or off, the LED driver must quickly adapt (transition time in <200 μs) in order to reduce visible flicker and also to limit current overshoots (<20%) which can potentially damage the LEDs. Typically, the input voltage in automotive applications is on average 12 VDC (which can vary from approximately 9 VDC to 16 VDC), such as from an automotive battery/alternator system. However, a string of LEDs ideally should be driven with a constant current to be supplied regardless of the quantity of active LEDs. Thus, an output voltage applied to the string of LEDs will vary up or down according to the quantity of active LEDs. Transitions among states comprising different quantities of active LEDs can lead to challenges for many power stage topologies, including 4WSBB topologies. A barrier to wide adoption of 4WSBB power topology remains the high overshoot current when switching the LED load, due in part to a high output capacitance which prevents fast transitions on an output node of the power stage. This high overshoot current has the potential to damage LEDs in the string. Specifically, the description below explains the transition between a first quantity of LEDs having a target voltage of 36V and a second (fewer) quantity of LEDs having a target voltage of 12V, however, the operations can be adapted to other use cases and applications.

An initial state before the operations of FIG. 4, includes a load regulation state, which is also discussed in the context of operation 421. In this load regulation state, CPU 321 compares measured output current (V_IOUT) against a current setpoint indicated by parameters stored in data storage 325. CPU 321 can then calculate a control effort, referred to as a gain, for a compensator block of regulator 322 which translates the gain into buck and boost PWM duty cycles for power stage 330 control signaling (e.g., (PWM1H, PWM1L, PWM2H, and PWM2L). These PWM duty cycles set a target Vout at node 317, which then produces a current based on the state of the load (e.g., quantity of active LEDs).

In one example, regulator 322 can employ an algorithm for load regulation that implements a 2-pole 2-zero digital compensator to regulate the supplied current to a selected current across the load, namely the selected quantity of LEDs. This forms a closed-loop system that continuously monitors load current and compares to the target current to calculate an error, the error is used by the digital compensator of regulator 322 to adjust the duty cycle of the PWMs controlling power stage 330.

However, when a load at node 318 changes rapidly in magnitude, such as during activation or deactivation of a selected quantity of LEDs, CPU 321 and regulator 322 detect and compensate for this transient condition. Thus, in operation 409, CPU 321 obtains a request for a change in a quantity of active load elements at an output node supplied by power stage 330. The request can be received over link 315 and communication system 324 as transferred from an external system and initiated by a user interface element, such as an automotive headlight selector switch or other user interface element. In such examples, link 315 can indicate a change from low-to-high beam or high-to-low beam in an automotive headlight system.

Once a change in the quantity of LEDs is requested or detected, in operation 410, CPU 321 disables the digital compensator portion of regulator 322. This disabling can include deactivating, inhibiting, or bypassing of the digital compensator. This ensures that the feedforward compensation operations performed below can occur without conflicting with normal load regulation operations of the digital compensator. Although operation 410 is shown as preceding operations 412 and 417 in FIG. 4, portions of operation 410 can instead occur concurrent with, or later than, operations 412 and 417.

In operation 411, a selection among an increase or decrease in a quantity of active LEDs in load elements 340 is detected. In power systems other than lighting, operation 411 may involve CPU 321 detecting a selection among a load increase or a load decrease. For a load decrease scenario, operations 412-416 are performed. This load decrease scenario can include disabling or bypassing one or more LEDs among load elements 340, such as by using corresponding transistor/switch elements coupled in parallel to the one or more LEDs (not shown in FIG. 4). For a load increase scenario, operations 417-420 are performed. This load increase scenario can include activating addition LEDs, such as by deactivating the bypass transistor/switch elements for corresponding LEDs.

Turning first to the load decrease scenario, in operation 412, CPU 321 enables an active discharge circuit coupled to the output node. In this example, active discharge circuit 350 is enabled by controlling the gate terminal of transistor 352 via the PWM_DIS control signal. The activation of active discharge circuit 350 provides a pathway for charge at node 317 to drain to ground through transistor 352 and resistor 351. The discharge rate is a function of the properties of transistor 352 and resistor 351, as well as of PWM_DIS control signal. In some examples, a programmable delay is employed (in PWM cycles of power stage 330) between closing LED bypass switches for load elements 340 and starting active discharge with active discharge circuit 350. CPU 321 monitors the voltage at node 317, and determines when to turn off active discharge circuit 350, such as when a programmable setpoint voltage is reached.

In combination with activation of active discharge circuit 350, other operations can be performed with regard to load regulation elements of CPU 321 and regulator 322. In operation 413, CPU 321 can disable switching elements of power stage 330. In terms of FIG. 3, this includes disabling the PWM signals provided to transistors 333-336. The PWM1H, PWM1L, PWM2H, and PWM2L signals can be disabled in power controller 320, such as by CPU 321, or using a discrete circuit configured to clamp or disable the PWM signals. Gate drivers 331-332 might provide this functionality in some examples, as commanded by CPU 321 or other circuitry. As mentioned above, active discharge circuit 350 can be activated until a setpoint voltage is reached (also as noted in operation 414). Once the setpoint voltage is reached, then the PWM1H, PWM1L, PWM2H, and PWM2L signals can be re-enabled by power controller 320 or other controlling circuitry. Then, a quantity of active load elements can be decreased, such as by a circuit configured to activate bypass switches/transistors coupled to associated LEDs.

In this load decrease example, node 317 is drained of charge before a quantity of active load elements is decreased, and the output voltage at node 318 decreases due to the active discharge by active discharge circuit 350. This can advantageously prevent or reduce current overshoot at load elements 340. Voltage trip points or voltage thresholds for disengaging active discharge circuit 350 during a high-to-low load transition (e.g., load decrease scenario) can be implemented using comparator circuitry. Voltage and current sensing might be implemented using analog-to-digital comparators included in power controller 320 (i.e., "on chip") or using discrete comparator circuitry. After the voltage setpoint is reached and active discharge circuit 350 is deactivated, power controller 320 can resets the digital compensator and load control coefficients for the new operating point of the selected quantity of load elements 340.

Turning now to the load increase scenario, operation 417 includes increasing the quantity of active load elements, such as a quantity of LEDs which are active (not bypassed). This introduces a stepwise increase in load for power stage 330. Conventionally, regulator 322 might continue to operate in a load regulation mode, which can produce a large stepwise increase in gain and an overcurrent or overshoot condition for load elements 340. However, in this example, concurrent with the load increase, operation 418 includes CPU 321 applying a restricted gain to regulator 322 for a first amount of time. This restricted gain can take various forms, such as noted in operation 419, with CPU 321 applying a linear increase in gain, also referred to as a slewed gain or ramp in gain. The linear gain rate of increase and first amount of time (in terms of target gain) can be programmable and associated gain values stored in data storage 325. This linear gain increase is applied until a target gain or target time is eventually reached by regulator 322. To apply this linear gain increase, CPU 321 can bypass or override the digital compensator of regulator 322 with the gain ramp.

Once the target gain or target time is reached, operation 420 includes CPU 321 applying a constant gain for a second amount of time. The constant gain and second amount of time can be programmable and associated gain values stored in data storage 325. CPU 321 holds the gain constant for a selected amount of 'cycles' of the digital compensator of regulator 322. This constant gain allows power stage 330 time to adjust to the new gain level resultant from the increase in load elements. After the second amount of time, CPU 321 instructs regulator 322 to resume load regulation operations and restart/reset the digital compensator, as noted in operation 421. CPU 321 might reset the digital compensator of regulator 322 and load control coefficients for the new operating point of the selected quantity of load elements 340.

Turning now to several examples of graphical representations of load regulation and enhanced transient response, FIGS. 5-8 are presented. The examples in FIGS. 5-8 can apply to any of systems and configurations discussed herein, such as power system 100 of FIG. 1, headlight assembly 200 of FIG. 2, power system 300 of FIG. 3, or control system 900 of FIG. 9, among systems and configurations. However, for purposes of illustration, elements of FIG. 3 are referenced in FIG. 5-8. The examples in FIGS. 5-8 illustrate the behavior of enhanced feedforward gain control algorithms for optimized load transient response of four-switch buck-boost (4SWBB) converters. With the enhanced techniques and elements described herein, enhanced controlled load transitions and current overshoots of less than 20% are provided. Also, as noted herein, the various transition parameters, e.g., voltage trip points, switch delays, and compensator parameters, are programmable/adjustable. Thus, the examples in FIGS. 5-8 can vary based on implementation and actual parameters as programmed.

Figure 5:
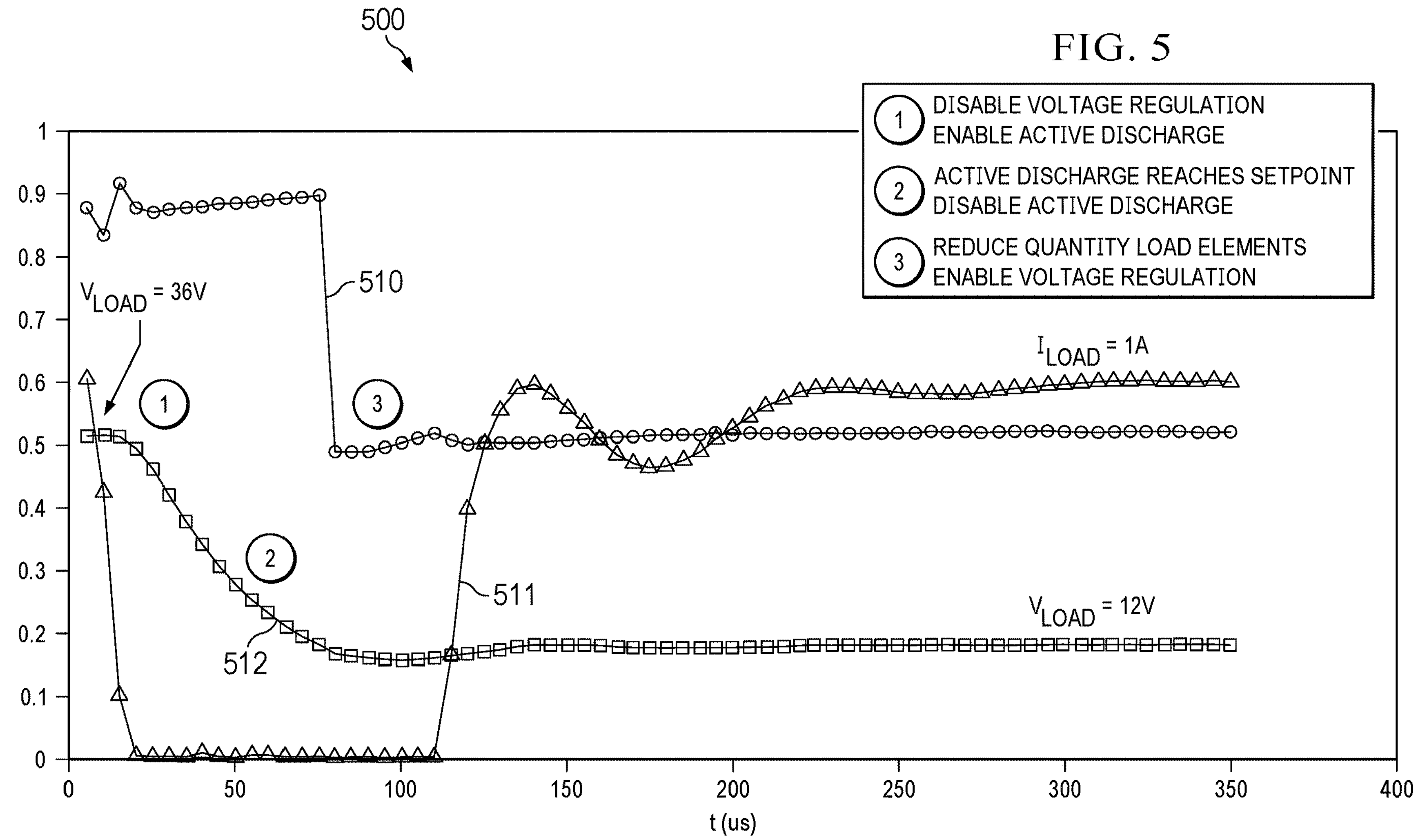
FIG. 5 illustrates an example of decreasing load transition response of voltage conversion circuitry in an implementation.
Figure 6:
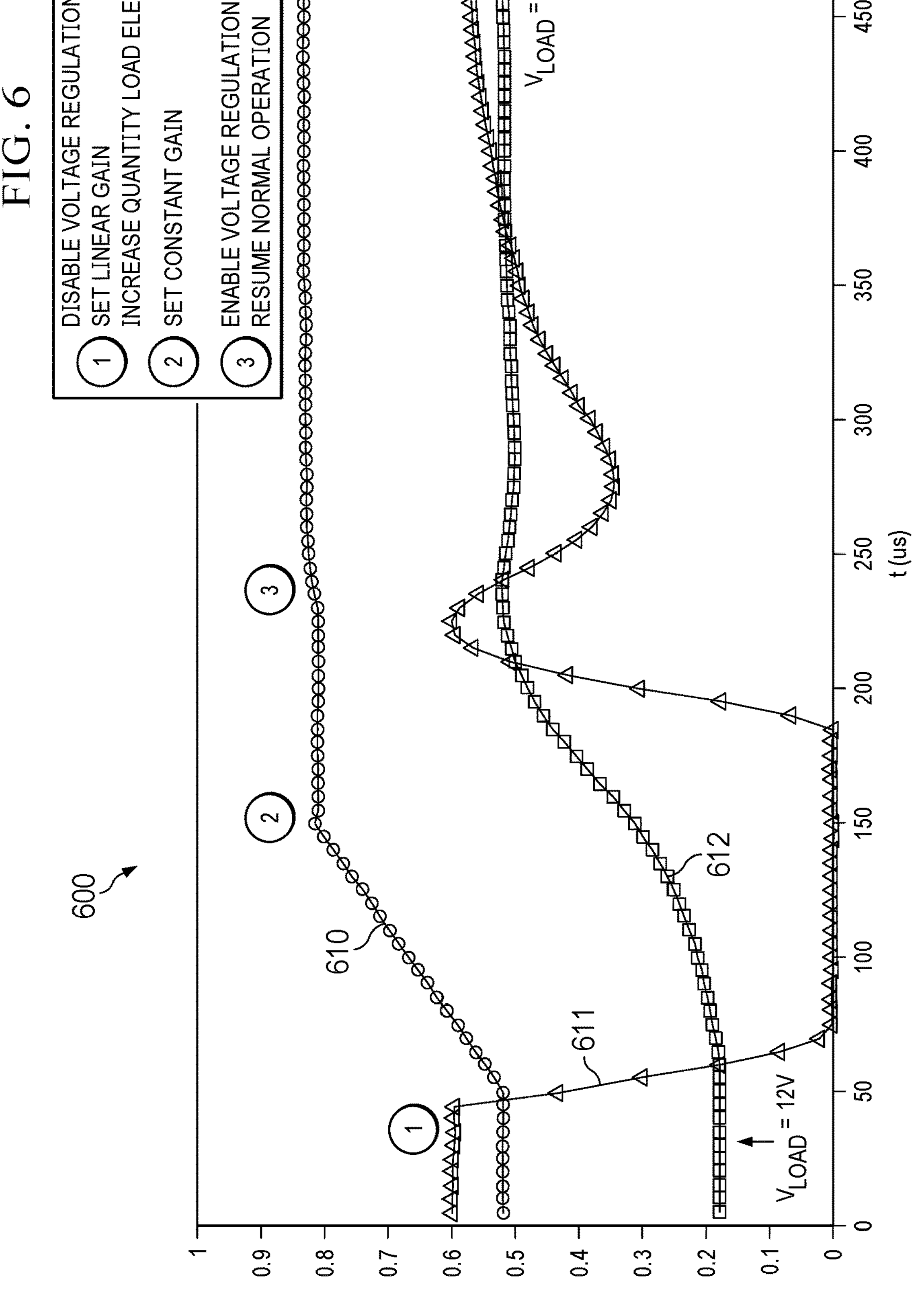
FIG. 6 illustrates an example of increasing load transition response of voltage conversion circuitry in an implementation.
Figure 7:
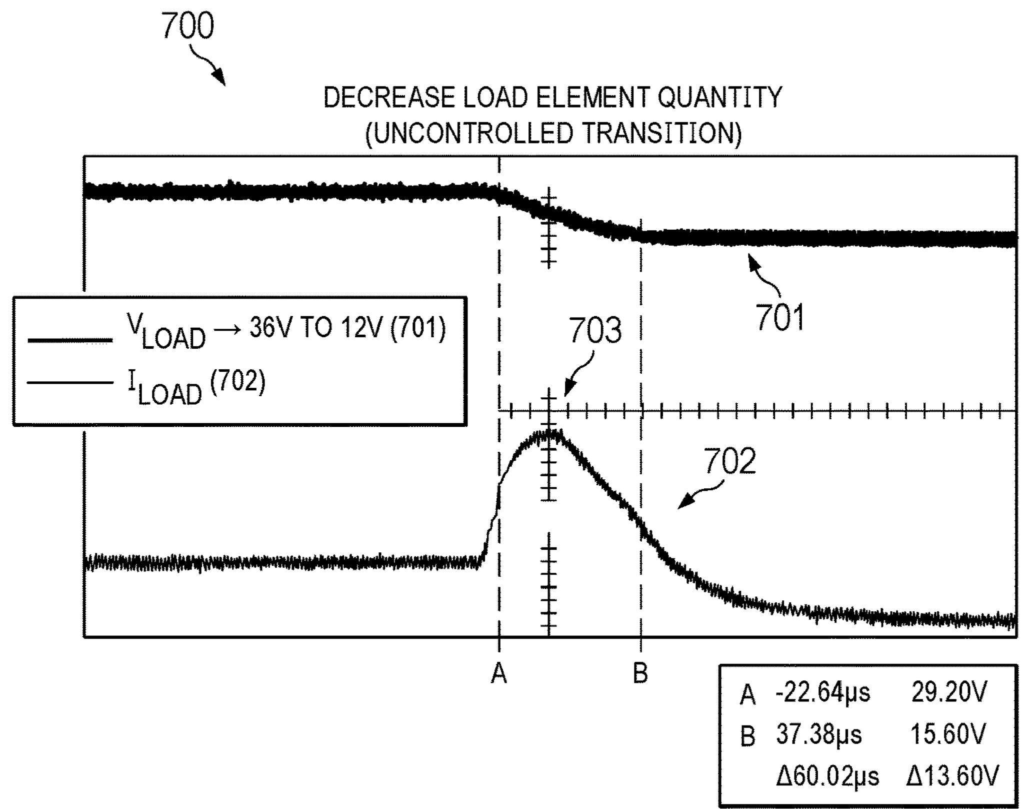
FIG. 7 illustrates an example comparison with enhanced load increase response of voltage conversion circuitry in an implementation.
Figure 7:
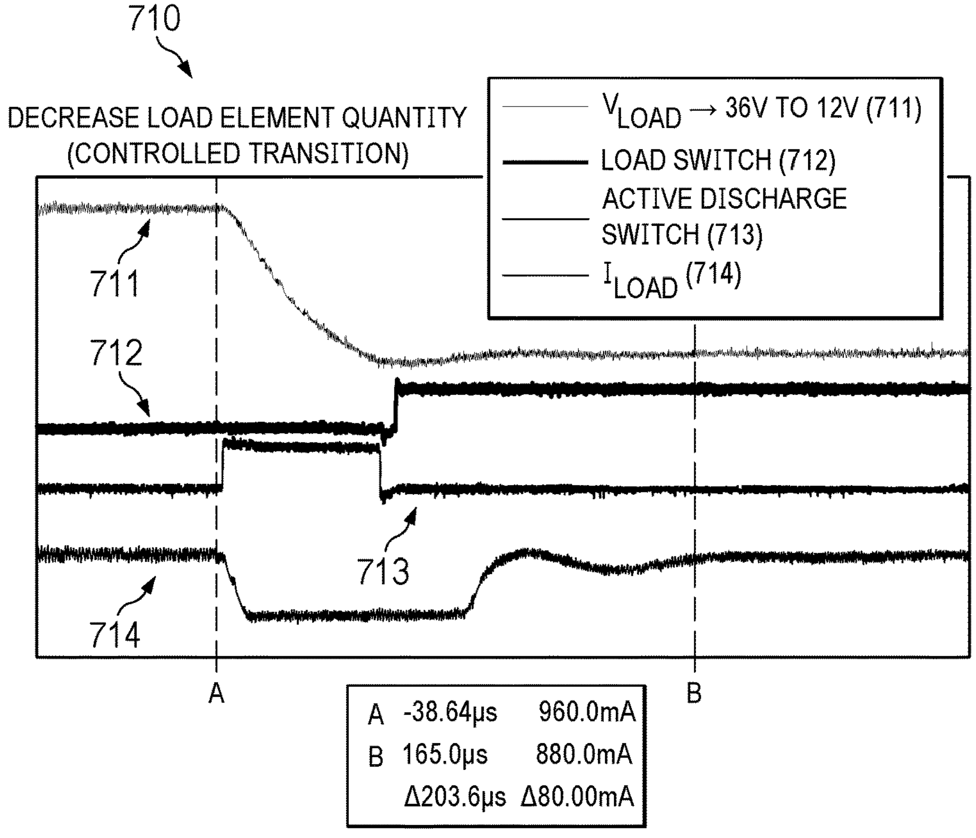
Figure 8:
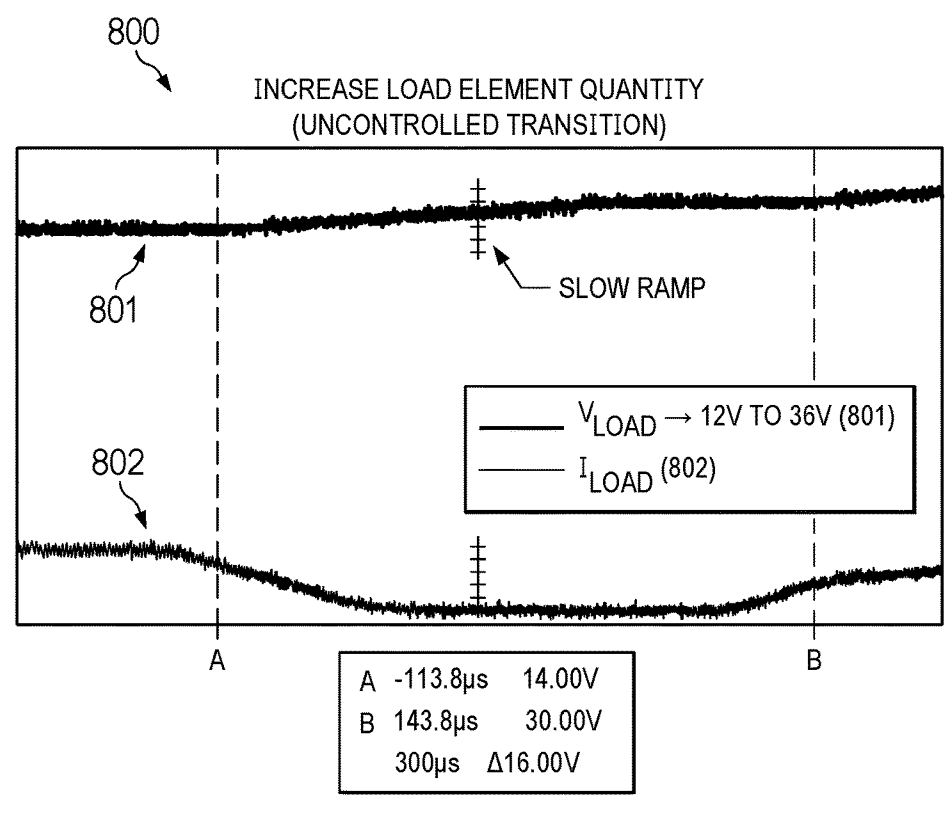
FIG. 8 illustrates an example comparison with enhanced load decrease response of voltage conversion circuitry in an implementation.
Figure 8:
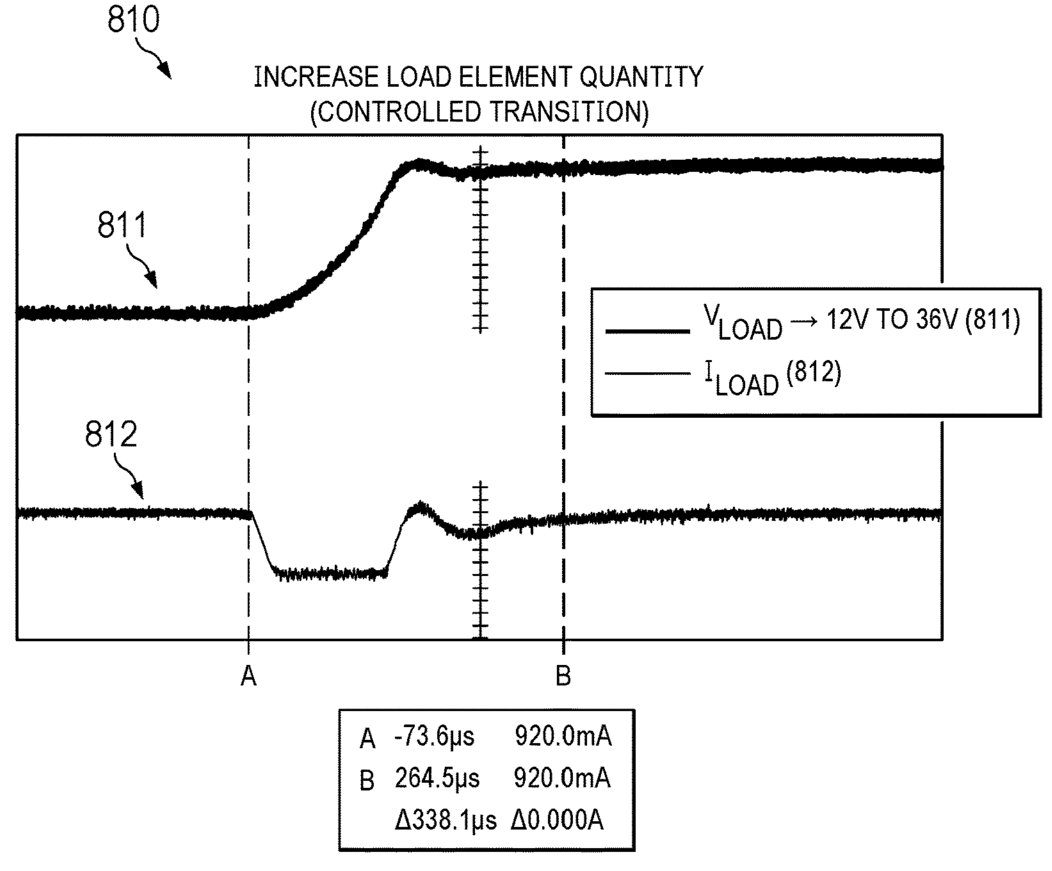

FIG. 5 includes example load decrease conditions, with graph 500 illustrating various signals corresponding to output behavior of a power system. FIG. 6 includes example load increase conditions, with graph 600 illustrating various signals corresponding to output behavior of a power system. FIG. 7 includes example decrease in load conditions, with graph 700 illustrating a conventional solution, and graph 710 illustrating an enhanced transient response solution as described herein. FIG. 8 includes example increase in load conditions, with graph 800 illustrating a conventional solution, and graph 810 illustrating an enhanced transient response solution as described herein.

Turning now to FIG. 5, graph 500 illustrates an example of decreasing load transition response of voltage conversion circuitry in an implementation. The vertical axis of graph 500 represents a magnitude of values, such as a gain applied in regulator 322 for trace 510, load current for trace 511, or load voltage for trace 512. The horizontal axis of graph 500 represents a time axis, in μs. At an initial state, a certain quantity of load elements 340 are enabled, and a commanded change in the quantity of load elements 340 indicates a reduced quantity. Responsive to this commanded change in quantity, the quantity of active load elements is not initially changed. Instead, as noted by state 'l' in graph 500, CPU 321 enables active discharge circuit 350, which begins to drain charge from node 317 and reduce a voltage level at node 317 (see trace 512). A setpoint voltage level is eventually reached, as noted by state '2' in graph 500, and the quantity of load elements 340 is then changed to the reduced quantity, as noted in state '3' in graph 500. Also, CPU 321 re-enables load regulation in regulator 322, which is shown by trace 510 as a rapid decrease in gain to supply the reduced quantity of active load elements. The operations noted in graph 500 act to reduce or prevent an overcurrent or overshoot condition resultant from the change in load, such as when voltage applied to load elements 340 is transitioned from 36V to 12V in trace 512 in graph 500.

FIG. 6 illustrates graph 600 as an example of increasing load transition response of voltage conversion circuitry in an implementation. The vertical axis of graph 600 represents a magnitude of values, such as a gain applied in regulator 322 for trace 610, load current for trace 611, or load voltage for trace 612. The horizontal axis of graph 600 represents a time axis, in μs. At an initial state, a certain quantity of load elements 340 are enabled, and a commanded change in the quantity of load elements 340 indicates an increased quantity. Responsive to this commanded change in quantity, as noted by state 'l' of graph 600, CPU 321 bypasses or disables the load regulation function of regulator 322. CPU 321 applies a linear gain increase concurrent with increasing the quantity of active load elements 340. The linear gain increase is shown between state '1' and state '2' in graph 600 on trace 610. The gain is ramped or increased until a target gain is reached. Once the gain target is reached resultant from the linear gain increase, CPU 321 then applies a constant gain in regulator 322, corresponding to state '2' in graph 600. This constant gain is applied for a selected amount of time, and when this time limit is reached then CPU 321 re-enables load regulation in regulator 322, which is shown by trace 610 as leading to no change in gain or a slight change in gain to supply the increased quantity of active load elements. This is due in part to the selection of the gain ramp rate and the constant gain timeframe, such that the increased load is reached for power stage 330 before the load regulation is re-enabled. The operations noted in graph 600 act to reduce or prevent an overcurrent or overshoot condition resultant from the change in load, such as when the voltage applied to load elements 340 is transitioned from 12V to 36V in trace 612 in graph 600.

FIG. 7 illustrates an example comparison with enhanced load increase response of voltage conversion circuitry in an implementation. Graph 700 shows several traces illustrating a conventional solution for transient conditions. Trace 701 represents the voltage presented to a load, such as at node 317 of FIG. 3. In this case, trace 701 shows the transition from 36V to 12V at node 317, indicating a decrease in the quantity of load elements. However, graph 700 does not apply any of the enhanced techniques for preventing or reducing overcurrent or overshoot at load elements 340. Thus, trace 702 shows an uncontrolled transient transition, leading to a large and rapid increase in current between time points 'A' and 'B' which corresponds to an overcurrent or overshoot condition 703 of over 30%. This overcurrent or overshoot condition can damage load elements 340 and is an unwanted operation. The 30% overshoot in this example is limited in part from overcurrent trip logic (not pictured) which can trigger on a selected overcurrent level. This overcurrent trip logic can disable switching elements of power stage 330, thereby limiting further overshoot.

Graph 710 shows several traces illustrating an enhanced transient response, corresponding to a controlled transient transition. Trace 711 corresponds to a load voltage, indicating a change in load voltage from 36V to 12V which occurs for a decrease in the quantity of active load elements. Trace 712 corresponds to a load switch, which changes the quantity of active load elements. Trace 713 corresponds to the activation of active discharge circuit 350. Trace 713 corresponds to current supplied to load elements 340.

In operation, at time point 'A', a command is received to change the quantity of active load elements, and CPU 321 responsively disables load regulation of regulator 322, along with enabling active discharge circuit 350. Active discharge circuit 350 reduces the voltage at load elements 340, as seen in trace 711. Once a setpoint voltage is reached, then CPU 321 disables active discharge circuit 350 (see trace 713) concurrent with enabling bypass switches for selected ones of load elements 340. Then, CPU 321 can re-enable load regulation of regulator 322, which establishes current in trace 714 to settle to the new load without the large overshoot experienced in graph 700. The overcurrent or overshoot in trace 714 corresponds to less than 20%.

FIG. 8 illustrates an example comparison with enhanced load decrease response of voltage conversion circuitry in an implementation. Graph 800 shows two traces illustrating a conventional solution for transient conditions. Trace 801 represents the voltage presented to a load, such as at node 317 of FIG. 3. In this case, trace 801 shows the transition from 12V to 36V at node 317, indicating an increase in the quantity of load elements. However, graph 800 does not apply any of the enhanced techniques for preventing or reducing overshoot at load elements 340 or for more rapid transitions for load increases. Thus, trace 802 shows an uncontrolled transient transition, leading to a slow load voltage transition of approximately 257.6 μs (time points 'A' and 'B') with a current overshoot of over 30% applied to load elements 340. This transition can lead to unwanted flicker or dimming in LEDs.

Graph 810 shows several traces illustrating an enhanced transient response, corresponding to a controlled transient transition. Trace 811 corresponds to a load voltage, indicating a change in load voltage from 12V to 36V which occurs for an increase in the quantity of active load elements. Trace 812 corresponds to current supplied to load elements 340. The operations which produce traces 811 and 812 include CPU 321 increasing the quantity of active load elements 340 concurrent with applying a linear gain ramp in regulator 322 until a target gain is reached, followed by a constant gain for a selected period of time. This controlled or restricted gain provides a more controlled current transition for load increases than seen in graph 800. Notably, the transition time in graph 800 (time points 'A' to 'B') is approximately 338.1 μs but achieves an overshoot of less than 20%.

Figure 9:
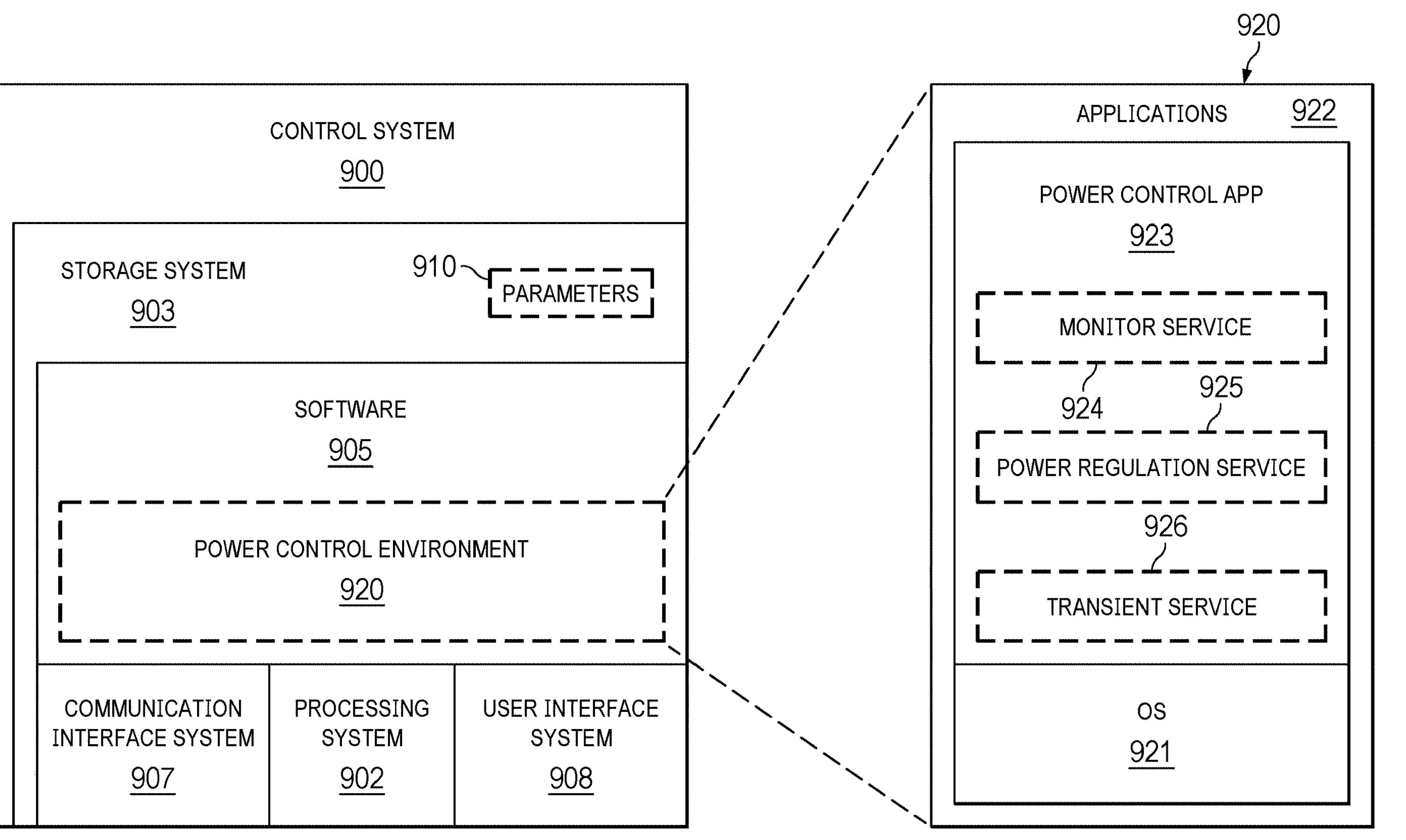
FIG. 9 illustrates an example implementation of a control system capable of implementing any of the control schemes discussed herein.

FIG. 9 illustrates an example implementation of a control system capable of implementing any of the control schemes discussed herein. FIG. 9 includes control system 900. Control system 900 is representative of any system or collection of systems in which the various operational techniques, architectures, scenarios, and processes disclosed herein may be implemented. For example, control system 900 can be used to implement controller or control portions of power controller 120 or transient control element 140 of FIG. 1, power controller 320 of FIG. 3, or any of the control, transient detection, or transient control elements of any of the Figures herein.

Control system 900 may be implemented as a single apparatus, system, or device or may be implemented in a distributed manner as multiple apparatuses, systems, or devices. Control system 900 includes, but is not limited to, processing system 902, storage system 903, software 905, communication interface system 907, and user interface system 908. Processing system 902 is operatively coupled with storage system 903, communication interface system 907, and user interface system 908.

Processing system 902 loads and executes software 905 from storage system 903. When executed by processing system 902 to control a power system to perform load regulation, transient detection, enhanced transient response, load transition control and regulation, overshoot mitigation, and overshoot correction operations, software 905 directs processing system 902 to operate as described herein for at least the various processes, operational scenarios, and sequences discussed in the foregoing implementations. Control system 900 may optionally include additional devices, features, or functionality not discussed for purposes of brevity.

Processing system 902 may comprise processing circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, graphics processing units, programmable logic devices, field-programmable logic devices, application specific integrated circuit devices, digital signal processors, and discrete logic, as well as any other type of processing device and supporting circuitry, combinations, or variations thereof.

Storage system 903 may comprise any tangible computer readable storage media readable by processing system 902 and capable of storing software 905. Storage system 903 may include volatile and nonvolatile, removable and non-removable media implemented in any method or technology for storage of information, such as computer readable instructions, data structures, control programs, program modules, or other data. Examples of storage media include random access memory, read only memory, magnetic disks, optical disks, flash memory, virtual memory and non-virtual memory, magnetic storage media, magnetic storage devices, or any other suitable storage media. In no case is the computer readable storage media a propagated signal. In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions comprising power control environment 920 to implement operations 400 illustrated in FIG. 4 or other operations discussed herein. In particular, the program instructions may include various components or modules that cooperate or otherwise interact to carry out the various processes and operational scenarios described herein. The various components or modules may be implemented in compiled or interpreted instructions, or in some other variation or combination of instructions. Software 905 may include additional processes, programs, or components, such as operating system (OS) software (e.g., 921) or other application software (e.g., 922), in addition to or that include power control environment 920. Software 905 may also comprise firmware or some other form of machine-readable processing instructions executable by processing system 902.

Software 905, when loaded into processing system 902 and executed, may transform a suitable apparatus, system, or device (of which control system 900 is representative) overall from a general-purpose computing system into a special-purpose computing system customized to control a power system to affect load regulation, transient detection, enhanced transient response, load transition control and regulation, overshoot mitigation, and overshoot correction operations, among other power monitoring and control operations. Indeed, encoding software 905 on storage system 903 may transform the physical structure of storage system 903. For example, if the computer-readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to solid-state media, magnetic media, or optical media. Other transformations of physical media are possible without departing from the scope of the present description, with the foregoing examples provided only to facilitate the present discussion.

In one example implementation, software 905 includes control process power control environment 920 comprising operating system 921 and applications 922, at least some of which are representative of the operational techniques, algorithms, architectures, scenarios, and processes discussed with respect to the included Figures. Software 905 can also employ parameters 910 stored by storage system 903. Parameters 910 can be representative of any programmable registers, software-defined parameters, status indicators, user-controlled feature settings, or adjustment parameters discussed herein. For example, parameters 910 can include indications of discharge setpoint voltages or thresholds, indications of the linear gain rates, indications of a constant gain levels, and indications of time periods corresponding to a first amount of time for applying a linear gain, and a second amount of time for applying a constant gain, among other parameters.

Applications 922 include monitor service 924, power regulation service 925, and transient service 926. One or more software or firmware modules can perform functions of these services, and such modules can provide shared or distributed functionality. Monitor service 924 is configured to monitor for indications or requests which change configurations of a load coupled to an output node of a power stage, such as a quantity of active LEDs. Monitor service 924 can also monitor current supplied to a load and voltages presented to a load. Monitor service 924 can read various programmable thresholds or trends from parameters 910 for use during this monitoring.

Power regulation service 925 can perform various control operations of a power stage or voltage conversion circuit over various load states to regulate an output voltage to a setpoint voltage or maintain a target current supplied to a load, among other operations. A gain can be applied to a load regulation element to produce control signaling, such as pulse-width modulated signals, which activate or deactivate switching elements among a voltage conversion circuit. Power regulation service 925 can be disabled or bypassed during transient events detected by monitor service 924, and receive instructions or indications on when to apply various linear or constant gains from transient service 926.

Transient service 926 is configured to perform various transient response operations to mitigate overshoot for currents/voltages at output nodes during transient conditions detected by monitor service 924. Based on an increase in the quantity of the active load elements, transient service 926 can activate load elements and apply a restricted gain to a corresponding voltage conversion circuit. Transient service 926 can apply the restricted gain by applying a linear gain to the voltage conversion circuit for a first amount of time and applying a constant gain to the voltage conversion circuit for a second amount of time. Transient service 926 can return the voltage conversion circuit after the second amount of time to a load regulation operation performed by power regulation service 925 for the output node.

Based on a decrease in the quantity of the active load elements, transient service 926 can enable an active discharge circuit coupled to the output node before the quantity of the active load elements is decreased. Transient service 926 can enable the active discharge circuit by disabling switching elements of the voltage conversion circuit and activating a discharge transistor coupled to the output node that reduces charge stored at the output node. Transient service 926 can instruct power regulation service 925 to place the switching elements of the voltage conversion circuit into high impedance states. Responsive to the active discharge circuit reaching a discharge setpoint voltage at the output node, transient service 926 can decrease the quantity of the active load elements and deactivate the discharge transistor.

Communication interface system 907 may include communication connections and devices that allow for communication with various circuit elements, such as discrete circuit elements, transistors, interface logic, analog-to-digital (A/D) or digital-to-analog (D/A) conversion units, or electrical components over communication links or communication networks (not shown). Examples of connections and devices that allow for communication may include logic interfaces, off-chip communication elements, signal drivers, signal receivers, transceivers, network interface controllers, and other communication circuitry. The connections and devices may communicate over communication media to exchange communications with other computing systems or networks of systems, such as metal, glass, air, or any other suitable communication media. Communication between control system 900 and other elements or systems (not shown) via communication interface system 907 may occur over data links, control links, communication links, or communication networks and in accordance with various communication protocols, combinations of protocols, or variations thereof. For example, control system 900 might transfer control signaling over digital communication links comprising Ethernet interfaces, serial interfaces, serial peripheral interface (SPI) links, inter-integrated circuit (I2C) interfaces, universal serial bus (USB) interfaces, UART interfaces, discrete signaling, or wireless interfaces.

User interface system 908 may include interfacing elements to receive user or operator programmed settings for operation of a power control system, such as for changing parameters 910. User interface system 908 can also provide feedback to users or operators on present settings held within parameters 910. In some examples, user interface system 908 receives and transfers various information over communication interface system 907. User interface system 908 may include separate user interface elements which include a software interface such as a terminal interface, command line interface, or application programming interface (API). User interface system 908 may also include physical user interfaces, such as keyboard, a mouse, a voice input device, or a touchscreen input device for receiving input from a user. User interface system 908 may include visualization/status interfaces, user command controls, and telemetry, such as user controls, start/stop controls, telemetry, operating mode control interfaces, visualization interfaces, and system characteristic calibration controls, among others. Output devices such as displays, speakers, web interfaces, terminal interfaces, and other types of output devices may also be included in user interface system 908. User interface system 198 may also include associated user interface software executable by processing system 902 in support of the various user input and output devices discussed above.

The techniques described in this disclosure may be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various circuit elements and interconnection architectures discussed herein are employed according to the descriptions above. However, it should be understood that the disclosures and enhancements herein are not limited to these circuit elements and interconnection architectures. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs). Moreover, reference to transistor features such as gate, source, or drain is not intended to exclude any suitable transistor technologies. For instance, features such as source, drain, and gate are typically used to refer to a FET, while emitter, collector, and base are typically used to refer to a BJT. Such features may be used interchangeably herein. For instance, reference to the gate of a transistor may refer to either the gate of a FET or the base of a BJT, and vice-versa. In some examples, a control terminal may refer to either the gate of a FET or the base of a BJT. Any other suitable transistor technologies can be used. Any such transistors can be used as a switch, with the gate or base or other comparable feature acting as a switch select input that can be driven to connect the source and drain (or the emitter and collector, as the case may be).

References herein to a field effect transistor (FET) being "ON" (or a switch being closed) means that the conduction channel of the FET is present, and drain current may flow through the FET. References herein to a FET being "OFF"

(or a switch being open) means that the conduction channel is not present, and drain current does not flow through the FET. A FET that is OFF, however, may have current flowing through a body-diode of the transistor.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible within the scope of the claims.

What is claimed is:

1. A method, comprising:

obtaining a request for a change in a quantity of active load elements at an output node supplied by a voltage conversion circuit;

based on the request indicating a decrease in the quantity of the active load elements, enabling an active discharge circuit coupled to the output node before the quantity of the active load elements is decreased; and based on the request indicating an increase in the quantity of the active load elements, activating the load elements, applying a linear gain increase to the voltage conversion circuit for a first amount of time, and applying a constant gain to the voltage conversion circuit for a second amount of time.

2. The method of claim 1, wherein enabling the active discharge circuit comprises disabling switching elements of the voltage conversion circuit and activating a discharge transistor coupled to the output node that reduces charge stored at the output node.

3. The method of claim 2, further comprising, responsive to the active discharge circuit reaching a discharge setpoint voltage at the output node, decreasing the quantity of the active load elements and deactivating the discharge transistor.

4. The method of claim 3, further comprising:

retrieving an indication of the discharge setpoint voltage from a programmable register.

5. The method of claim 2, wherein enabling the active discharge circuit further comprises placing the switching elements of the voltage conversion circuit into high impedance states.

6. The method of claim 1, further comprising, after applying the constant gain for the second amount of time, returning the voltage conversion circuit to a load regulation operation for the output node.

7. The method of claim 1, further comprising:

retrieving indications of the first amount of time, the second amount of time, and the linear gain increase from a programmable register.

8. The method of claim 1, further comprising:

based on the request indicating the decrease in the quantity of the active load elements, causing the voltage conversion circuit to supply a reduced voltage at the output node; and based on the request indicating the increase in the quantity of the active load elements, causing the voltage conversion circuit to supply an increased voltage at the output node.

9. An apparatus, comprising:

a power controller configurable to obtain a request for a change in a quantity of active load elements at an output node supplied by a voltage conversion circuit; and a transient control circuit configurable to:

based on the request indicating a decrease in the quantity of the active load elements, enable an active discharge circuit coupled to the output node before the quantity of the active load elements is decreased; and based on the request indicating an increase in the quantity of the active load elements, activate the load elements, apply a linear gain increase for a first amount of time, and apply a constant gain for a second amount of time.

10. The apparatus of claim 9, wherein to enable the active discharge circuit, the transient control circuit is configurable to disable switching elements of the voltage conversion circuit and activate a discharge transistor coupled to the output node that reduces charge stored at the output node.

11. The apparatus of claim 10, wherein the transient control circuit is configurable to disable the active discharge circuit responsive to reaching a discharge setpoint voltage at the output node.

12. The apparatus of claim 11, further comprising:

a programmable register configurable to store an indication of the discharge setpoint voltage.

13. The apparatus of claim 9, wherein the transient control circuit is configurable to:

apply the linear gain increase by at least indicating to the power controller to apply the linear gain increase to the voltage conversion circuit for the first amount of time; and apply the constant gain by at least indicating to the power controller to apply the constant gain to the voltage conversion circuit for the second amount of time.

14. The apparatus of claim 9, wherein after applying the constant gain for the second amount of time, the power controller is configurable to return the voltage conversion circuit to a load regulation operation for the output node.

15. The apparatus of claim 9, further comprising:

programmable registers configurable to store indications of the first amount of time, the second amount of time, and the linear gain increase.

16. The apparatus of claim 9, wherein the power controller is configurable to cause the voltage conversion circuit to supply a reduced voltage at the output node based on the request indicating the decrease in the quantity of the active load elements; and wherein the power controller is configurable to cause the voltage conversion circuit to supply an increased voltage at the output node based on the request indicating the increase in the quantity of the active load elements.

17. The apparatus of claim 9, wherein the quantity of the active load elements comprise a set of light-emitting diodes (LEDs) coupled in series at the output node; and wherein the power controller is configurable to decrease the quantity of the active load elements by at least establishing a low resistance path across a portion of the set.

18. A system, comprising:

a power controller configurable to provide control signals for a voltage conversion unit providing power to an output node; and an active discharge circuit coupled to the output node and comprising a selectable discharge connection to ground;

wherein the power controller is configurable to:

enable the active discharge circuit prior to a decrease in a quantity of activated load elements at the output node; and increase the quantity of the activated load elements at the output node;

apply a linear gain increase to the voltage conversion unit for a first amount of time; and apply a constant gain to the voltage conversion unit for a second amount of time.

19. The system of claim 18, wherein the power controller is configurable to:

disable the voltage conversion unit when enabling the active discharge circuit;

enable the voltage conversion unit when disabling the active discharge circuit responsive to reaching a discharge setpoint voltage at the output node;

apply the linear gain increase for the first amount of time;

apply the constant gain for the second amount of time; and return to a load regulation operation for the output node after the second amount of time.

20. The system of claim 18, wherein the power controller is configurable to disable the active discharge circuit responsive to reaching a discharge setpoint voltage at the output node.

* * * * *